(12) United States Patent
Asokan

(10) Patent No.: US 12,664,116 B2
(45) Date of Patent: Jun. 23, 2026

(54) SYSTEM TO OPTIMIZE VIDEO STREAMING OF USB CAMERA VIA BULK ENDPOINT

(71) Applicant: e-con Systems India Private Limited, Chennai (IN)

(72) Inventor: Arun Asokan, Chennai (IN)

(73) Assignee: e-con Systems India Private Limited, Chennai (IN)

( * ) Notice: Subject to any disclaimer, the term of this patent is extended or adjusted under 35 U.S.C. 154(b) by 44 days.

(21) Appl. No.: 18/524,244

(22) Filed: Nov. 30, 2023

(65) Prior Publication Data

US 2025/0181535 A1      Jun. 5, 2025

(51) Int. Cl.
*G06F 13/38* (2006.01)
*G06F 13/42* (2006.01)

(52) U.S. Cl.
CPC ........ *G06F 13/385* (2013.01); *G06F 13/4234* (2013.01)

(58) Field of Classification Search
None
See application file for complete search history.

(56) References Cited

U.S. PATENT DOCUMENTS

| | | | |
|---|---|---|---|
| 6,311,294 B1 | 10/2001 | Larky et al. | |
| 6,704,310 B1 * | 3/2004 | Zimmermann ..... | H04L 12/6418 348/207.1 |
| 9,575,917 B1 * | 2/2017 | Zhu ....................... | G06F 13/385 |

| | | | |
|---|---|---|---|
| 10,402,364 B1 | 9/2019 | Vajravel et al. | |
| 2002/0078283 A1 | 6/2002 | Purcell et al. | |
| 2005/0083968 A1 | 4/2005 | Chan et al. | |
| 2005/0262262 A1 | 11/2005 | Chang et al. | |
| 2005/0265099 A1 * | 12/2005 | Hosokawa ............. | H04N 5/772 365/205 |
| 2006/0242340 A1 | 10/2006 | Ono | |
| 2007/0174533 A1 | 7/2007 | Tseng et al. | |
| 2008/0066088 A1 | 3/2008 | Lu et al. | |

(Continued)

FOREIGN PATENT DOCUMENTS

| | | |
|---|---|---|
| CN | 1818892 | 8/2006 |
| CN | 102012890 | 4/2011 |

(Continued)

*Primary Examiner* — Henry Tsai
*Assistant Examiner* — Aurangzeb Hassan
(74) *Attorney, Agent, or Firm* — Sage Patent Group

(57)      ABSTRACT

A system and method to optimize video streaming of a plurality of USB cameras streaming via a bulk interface of a universal serial bus (USB), the system comprising a host unit communicating on universal serial bus (USB) via the bulk interface, a throughput analyzer computer program residing in the host unit, at least a USB Camera with a varying throughput, a dynamically programmable image sensor varies a throughput of the USB camera, a throughput control block of the USB camera receives input from the throughput analyzer computer program and adjusts the throughput of the camera, the USB controller regulates a transmission of USB packet buffers from each of the USB Camera to the host unit. The method comprises assessing by the throughput analyzer computer program of the universal serial bus utilization by the host unit by including all connected devices, and includes selectively dropping a plurality of data packet/frames.

25 Claims, 21 Drawing Sheets

90

(56)     References Cited

U.S. PATENT DOCUMENTS

| | | | |
|---|---|---|---|
| 2011/0302334 A1* | 12/2011 | Ponnatota ......... | H04L 12/40136 |
| | | | 710/30 |
| 2012/0149305 A1 | 6/2012 | Zhodzishsky et al. | |
| 2019/0121752 A1* | 4/2019 | Chen ..................... | H04N 7/142 |
| 2022/0046186 A1* | 2/2022 | Fayad .................... | H04N 5/272 |
| 2024/0017745 A1* | 1/2024 | Cao .................. | B60W 50/0097 |

FOREIGN PATENT DOCUMENTS

| | | |
|---|---|---|
| JP | 2002300228 | 10/2002 |
| JP | 2003256152 | 9/2003 |

* cited by examiner

```
48C $ lsusb -t

/: Bus 04.Port 1: Dev 1, Class=root_hub, Driver=xhci_hcd/6p, 5000M
|_ Port 4: Dev 2, If 0, Class=Mass Storage, Driver=usb-storage, 5000M
/: Bus 03.Port 1: Dev 1, Class=root_hub, Driver=xhci_hcd/14p, 480M
|_ Port 5: Dev 13, If 0, Class=Vendor Specific Class, Driver=rt2800usb, 480M
|_ Port 12: Dev 4, If 0, Class=Human Interface Device, Driver=usbhid, 1.5M
/: Bus 02.Port 1: Dev 1, Class=root_hub, Driver=ehci-pci/2p, 480M
|_ Port 1: Dev 2, If 0, Class=Hub, Driver=hub/8p, 480M
/: Bus 01.Port 1: Dev 1, Class=root_hub, Driver=ehci-pci/2p, 480M
|_ Port 1: Dev 2, If 0, Class=Hub, Driver=hub/6p, 480M
```

Figure 10

SYSTEM TO OPTIMIZE VIDEO STREAMING OF USB CAMERA VIA BULK ENDPOINT

FIELD OF THE INVENTION

The present invention relates to optimizing video streaming of USB Cameras and more particularly relates to video streaming throughput for USB cameras based on BULK Endpoint or bulk transfer type interface of the universal serial bus.

BACKGROUND OF THE INVENTION

To comprehend the full context of this invention, it's essential to understand the characteristics and functionalities of USB 2.0 and USB 3.2 Gen 1 & 2, as well as the distinctions between BULK and ISOCH transfers. USB 2.0 and USB 3.2 Gen 1 & 2 are standard interfaces used for connecting various devices, including cameras, to a host unit such as a computer. USB 2.0 currently supports a maximum data transfer rate of 480 Mbps, while USB 3.2 supports transfer rates of the order of 5 Gbps, 10 Gbps or 20 Gbps based on generation and lanes.

These transfer rates are often not fully realized in practice due to various factors such as the type of transfer (ISOCH or BULK), the host unit's capabilities, and the utilization of the USB bus by other devices. ISOCH and BULK transfers serve different purposes. ISOCH transfers are designed for real-time data streams and guarantee a certain amount of bandwidth, ensuring that data is delivered at a specific rate. They are generally used for applications that require steady, uninterrupted data streams, such as video or audio streaming.

Isochronous or ISOCH transfers are characterized by their fixed service intervals and assured bandwidth. These attributes make them highly suitable for real-time data streaming applications, such as audio or video, where continuous data flow is critical. However, this strict service interval and assured bandwidth mechanism is a double-edged sword. While it ensures data is delivered consistently, it also limits the flexibility of bandwidth allocation. In the context of USB 3.2, even though it supports high bandwidth, the ISOCH endpoint can only utilize a restricted portion of it due to this fixed reservation done at enumeration.

For example up to 5 Gbps in case of USB 3.0. But the availability of bandwidth will vary heavily based in other devices connected. ISOCH interface on the other hand when connected, assigns an assured bandwidth for the device, which is typically much less than what bulk interface Offers. But the bandwidth won't vary once it is allocated. Even when other devices are connected after that, the ISOCH which is connected and allocated first gets the priority. Hence bandwidth related frame drops are much less there.

BULK transfers, on the other hand, do not have a guaranteed service interval or a fixed bandwidth allocation. They are designed for large, non-time-critical data transfers where the timing of the transfer is less important than the assurance of error-free delivery.

The BULK transfers' lack of a fixed bandwidth allocation can lead to performance issues in certain scenarios. When the USB camera generates a steady stream of video data using BULK transfers, it may exceed the host's throughput capabilities if the camera's data transfer rate is too high or if the host unit's conditions change. In such situations, the host unit may struggle to process the incoming data stream effectively, leading to random frame drops and reduced image quality. Having said that, in ideal situations we can achieve throughputs closer to the theoretical maximum of USB bus much higher than what could be achieved in an ISOCH endpoint.

USB Complete Fourth Edition—The complete USB guide by Jan Axelson, incorporated by reverence, gives a comprehensive explanation of Bulk, Isochronous, and also Interrupt transfers.

The present invention aims at addressing performance challenges related to the transmission of video data from USB cameras to host units with a primary focus on BULK endpoints.

OBJECTS OF THE INVENTION

An objective is to achieve maximum bandwidth throughput of USB bus.

Another objective is to get high bandwidth of bulk's throughput with better reliability.

SUMMARY OF THE INVENTION

The present invention stems on the intrinsic property of data transfer at a variable speed by the BULK endpoint interface of a universal serial bus.

The present invention is a optimizing system to regulate video streaming comprising at least one USB camera communicating via bulk endpoint interface or transfer method of a universal serial bus (USB) to a host unit through a circular buffer memory device.

The host unit is a computing device with a typical hardware configuration consisting of processor and memory including a professional laptop, a desktop computer or an embedded device and is particularly a USB interfaceable host unit having a varying throughput capability.

The USB Camera comprises following:

A USB Controller

A throughput control block

An Image Sensor

The optimizing system as per the present invention further comprises a plurality of inventive computer programs including the throughput analyzer computer program, and deploys one or more of the following optimization strategies:

varying the CMOS pixel clock, blanking time manipulation, and or selective packet drop Further a buffer fill time is deployed.

The optimizing system comprises two modes of operation: a static mode and a dynamic mode.

In the static mode of operation, the throughput analyzer computer program receives at least a static test data, or multiple test data from the USB controller of the USB camera and compares data transfer rate against the current throughput sent from the USB control block of the USB camera, wherein a data rate without an involuntary packet drop is provided as feedback to the throughput control block of the USB camera.

In the dynamic mode of operation, based on the resolution and frame rate achieved in the streaming application and the current throughput information, the feedback is given by the throughput analyzer to throughput control block of the USB camera.

The Throughput Analyzer computer program of the present invention, residing in the Host unit plays a crucial role in predicting a potential congestion in the USB BULK endpoint pipeline, by tracking a number of free buffer zones available in a circular buffer memory device incorporating a circular buffer architecture utilized for the data transfer.

If the number of free buffer zones is relatively large, it indicates that a sink is successfully retrieving data packets faster than or at the same rate as they are being put in by the source, and there is room for more data, here video frames. This signals no impending congestion. However, if the free buffer zones count starts to decrease significantly, it suggests that the sink is struggling to keep up with the source. This situation, if not managed, would eventually lead to buffer overflow, signalling potential congestion.

The intention of management of packet drop rate (PDR) is to get the free buffer zone count back to safe operating region which is a value higher than the low risk threshold. The packet drop strategy is a short term solution to avoid overflows in the pipeline.

The throughput analyzer computer program monitors a buffering time taken for a data packet to travel from the source to the sink for fine tuning the current data transfer rate. This additional measurement and control provides a more accurate and comprehensive information of the performance of the optimizing system, enabling the present invention to make more accurate predictions about potential congestion and facilitating timely throughput adjustments to maintain optimal data flow.

There can be situations when the host unit's throughput capabilities drop dramatically or the USB bus utilization increases significantly, making it difficult to maintain the data transfer rate without causing frame drops.

In such scenarios, instead of attempting to transmit all data and causing substantial frame drops or data congestion, this mode of the invention strategically drops frames at the source. This decreases the data transfer rate, thereby preventing the USB bus from being overwhelmed and ensuring a smoother video stream, albeit at a lower frame rate. This frame drop strategy is a proactive approach to managing data throughput and maintaining system performance in challenging conditions.

Strategic drop caters to several situational requirements. Non-critical near identical frames (91) are dropped when contents do NOT warrant micro-detailing. Critical near identical adjacent frames (92) are NOT dropped when contents warrant micro-detailing of the order of micro seconds including decision making based thereon. Selective frame drop is a prudent option where the incoming data from the image sensor (33) cannot be or cannot adequately be controlled through the Pixel clock control or Line time control strategies.

Selective frame drop is achieved by controlling the USB controller directly without changing any parameter of the Image sensor.

A plurality of above modes are deployed in different combinations and for static or dynamic methods.

BRIEF DESCRIPTION OF DRAWINGS

FIG. 1 is a representative diagram of a USB camera and a host unit with a circular buffer memory device, while

FIG. 10 is a screen shot of a Linux® tool.

DETAILED DESCRIPTION OF THE INVENTION

The present invention shall now be described with the help of accompanying drawings. It is to be expressly understood that several variations are possible around the inventive concept disclosed and the description should not be construed to limit the invention in any manner whatsoever except by the claims which follow.

Optimization as per the present invention essentially is around deriving benefits of bulk transfer as well as isochronous transfer by inventive methods, while avoiding known forced and random frame drop due to congestion in the universal serial bus, and instead exploit benefit of frames dropping in an organized, conscious and inventive manner, as described further on.

The present invention stems on the intrinsic property of data transfer at a variable speed by the bulk endpoint interface of a universal serial bus (USB).

Figure 1:
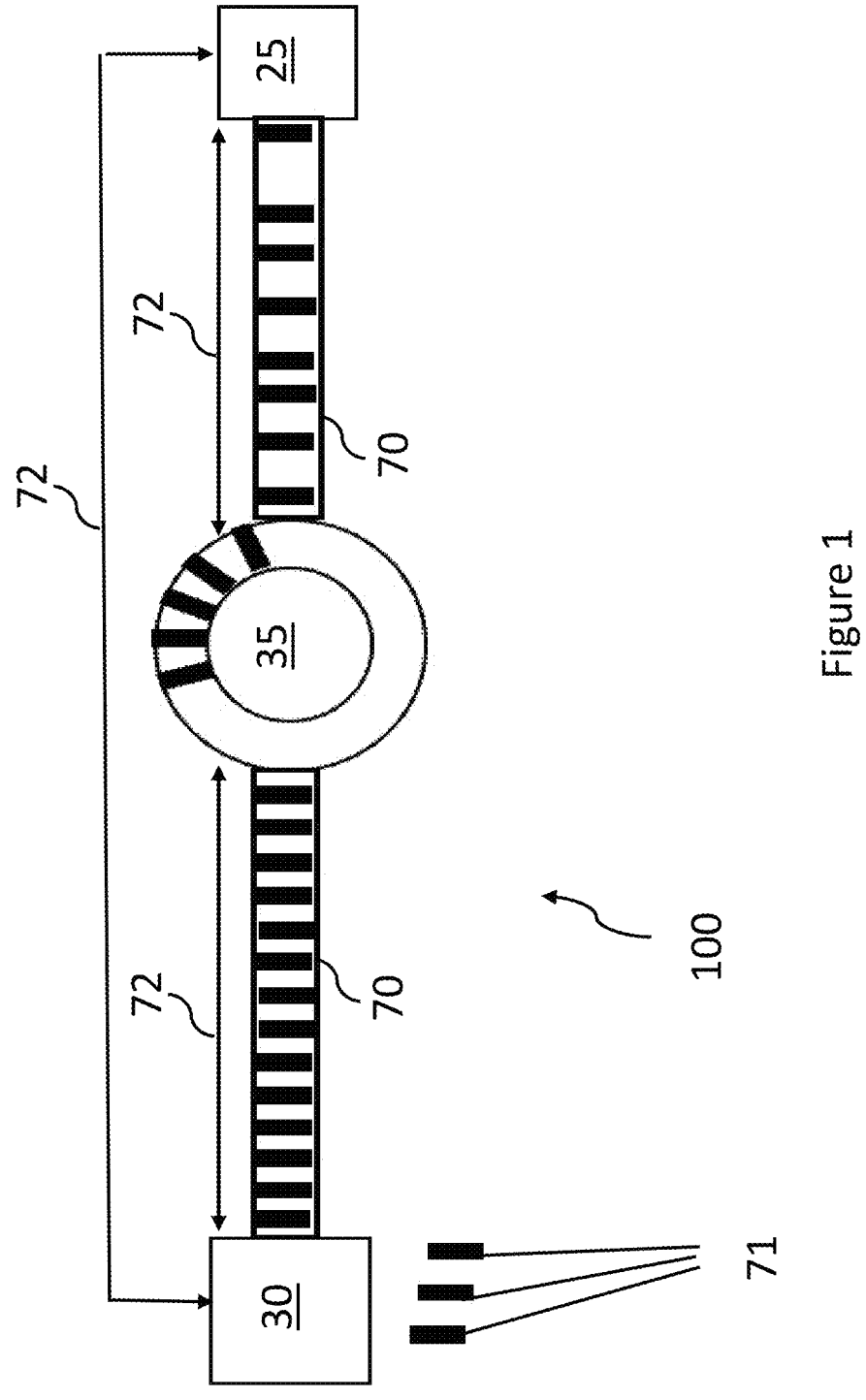
Figure 1A:
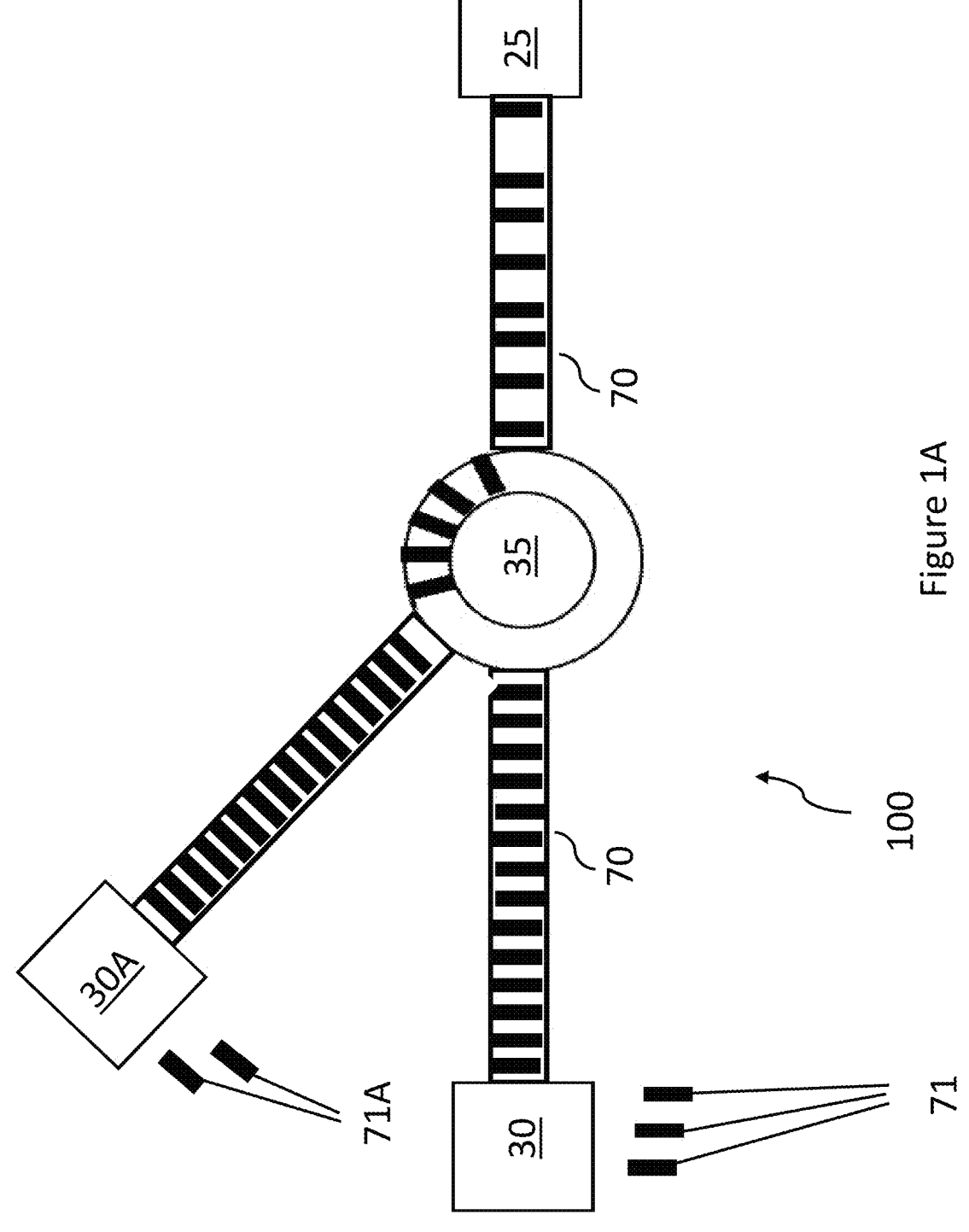
FIG. 1A is a representative diagram of a plurality of the USB cameras and the host unit with the circular buffer memory device.

In the representative diagram of FIGS. 1, 1A, the present invention is a optimizing system (100) to regulate video streaming comprising at least one USB camera (30) communicating via bulk endpoint interfaces or transfer method of a universal serial bus (USB) (70) to a host unit (25) through a circular buffer memory device (35), with a control communication (72) of control signals between the USB camera (30), the host unit (25), the circular buffer memory device (35). The control communication (72) preferably is through the universal serial bus (USB); however it is not limited thereto and could be done through I2C, universal asynchronous receiver transmitter or UART (34) or any other interfaces that might be available in the host unit (25).

The host unit (25) is a computing device with a typical high end desktop/laptop hardware configuration consisting of processor and memory including a professional laptop, a desktop computer or an embedded device and is particularly a USB interfaceable host unit (25) having a USB application responsive to said USB Camera USB output and a varying throughput capability.

The optimizing system (100) comprises two modes of operation: a static mode (80) and a dynamic mode (90).

Figure 2:
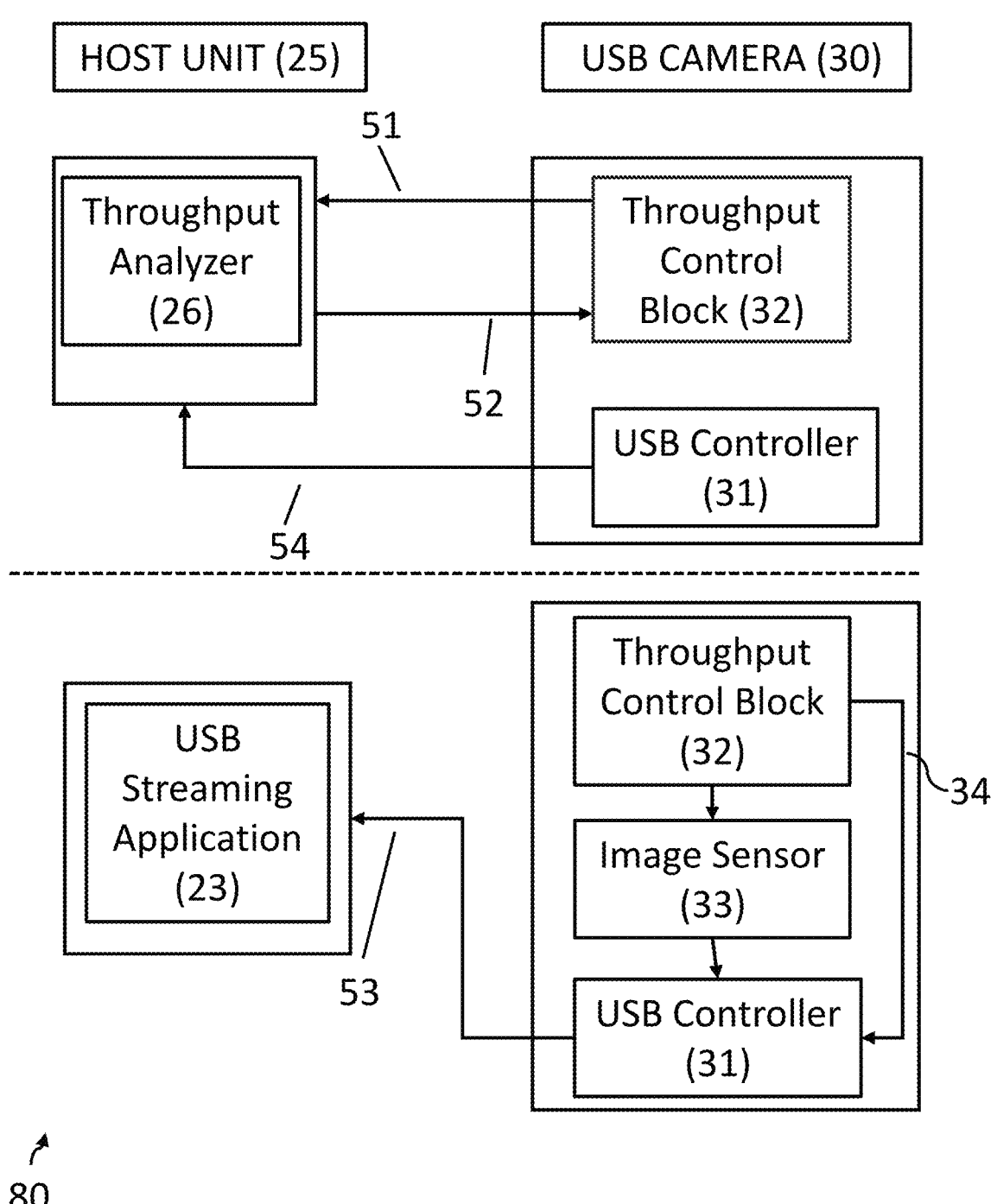
FIG. 2 is a software logic diagram in a static mode between the USB camera and the host unit.

Static Mode (80):

FIG. 2, in the static mode (80), a throughput analyzer computer program (26) initially validates available throughput on the USB bus (70). This information is used to adjust the camera streaming settings to match the available bandwidth. The process involves the following components and steps:

a. Throughput Analyzer Computer Program (26): Shown above a dotted line in the FIG. 2, the throughput analyzer computer program (26) evaluates an available throughput on the USB bus (70) in Megabits per second (Mbps) by analyzing factors such as resources of the host unit (25), connected USB devices, and universal serial bus utilization. This happens on demand, usually before video streaming; after which, and based on the throughput identified, a feedback is sent to the USB camera (30).

b. Video streaming: After the Throughput Analyzer computer program (26) identifies the available bandwidth, the USB camera streams the video data (53) according to the available throughput in USB's streaming interface through bulk endpoint, as shown below the dotted line in FIG. 2.

In the static mode (80) of operation, the throughput analyzer computer program (26) receives a static test data (54) from the USB controller (31) of the USB camera (30) and compares against the current throughput (51) sent from the USB control block (32) of the USB camera (30). Based on the difference, actual throughput available is provided as feedback (52) to a throughput control block (32) of the USB camera (30).

Figure 3:
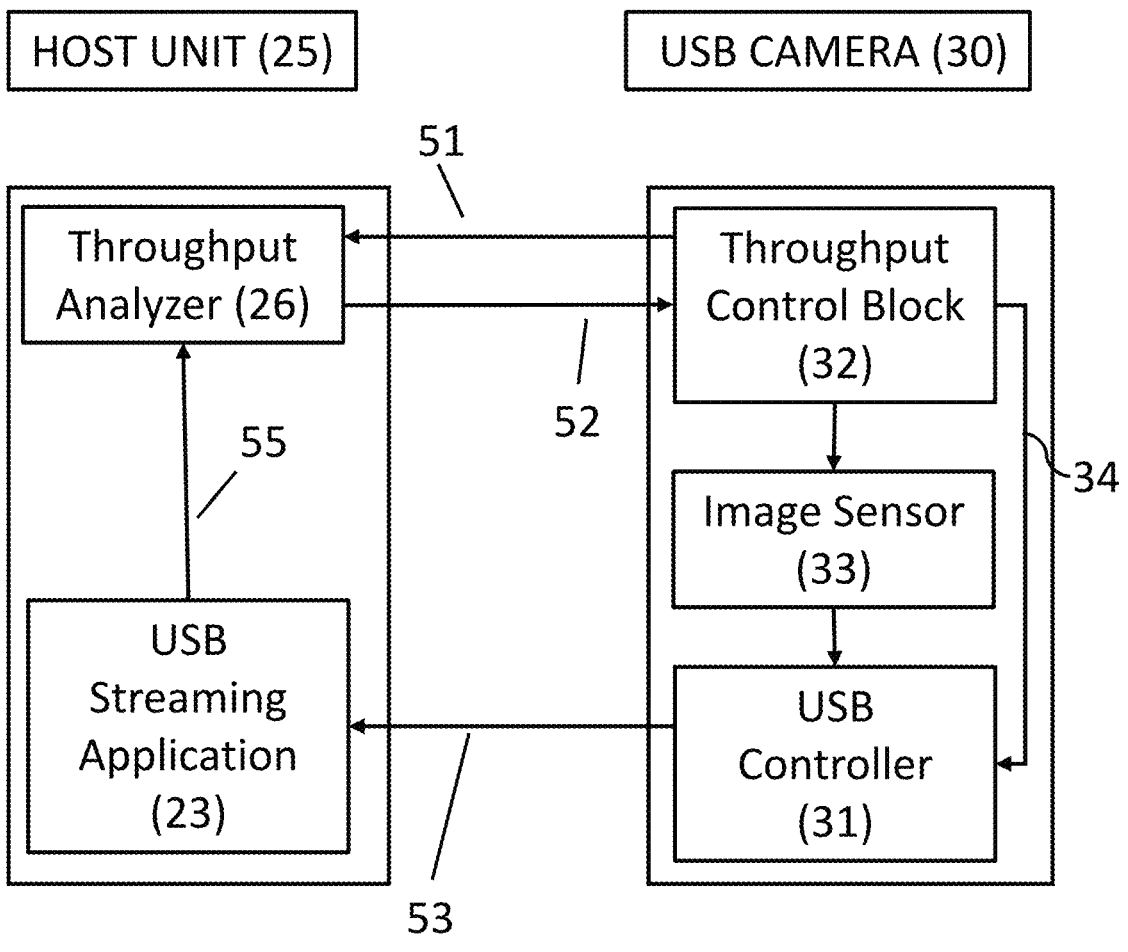
FIG. 3 is a software logic diagram in a dynamic mode between the USB camera and the host unit.

Dynamic Mode (90):

FIG. 3, in the dynamic mode (90), the optimizing system (100) periodically analyzes the throughput of the host unit (25) and adapts the streaming throughput (53) on the fly. The components and steps involved in this process are:

a. Periodic throughput analysis: The Throughput Analyzer computer program (26) continuously monitors the USB bus throughput and provides real-time updates on the available bandwidth. The feedback (52) in one embodiment is given through HID interface of USB. HID is Human Interface Device class in USB's standard list of classes. This interface class is typically used for small sized data transfer in very low latency which matches with the use case here.

b. Dynamic camera streaming: Based on the updated throughput information, the video camera's streaming throughput (53) is adjusted by controlling the USB packet buffer fill time, which is determined by the image sensor's readout times affected by camera image line blanking. This ensures that the camera's streaming throughput remains in sync with the available bandwidth on the universal serial bus (70), providing a smoother video stream and minimizing performance issues. The streaming happens in USB's streaming interface through bulk endpoint.

In the dynamic mode (90) of operation, based on the data throughput, resolution and frame rate achieved (55) in the streaming application and the current throughput information (51), a continuous feedback (52) is given by the throughput analyzer (26) to throughput control block (32) of the USB camera (30).

Control signals between host unit (25) and USB camera (30) comprise request/demand/information (51), input/feedback (52), USB data/image data (53)

static test data (54)

real time transfer rate data (55)

Figure 4:
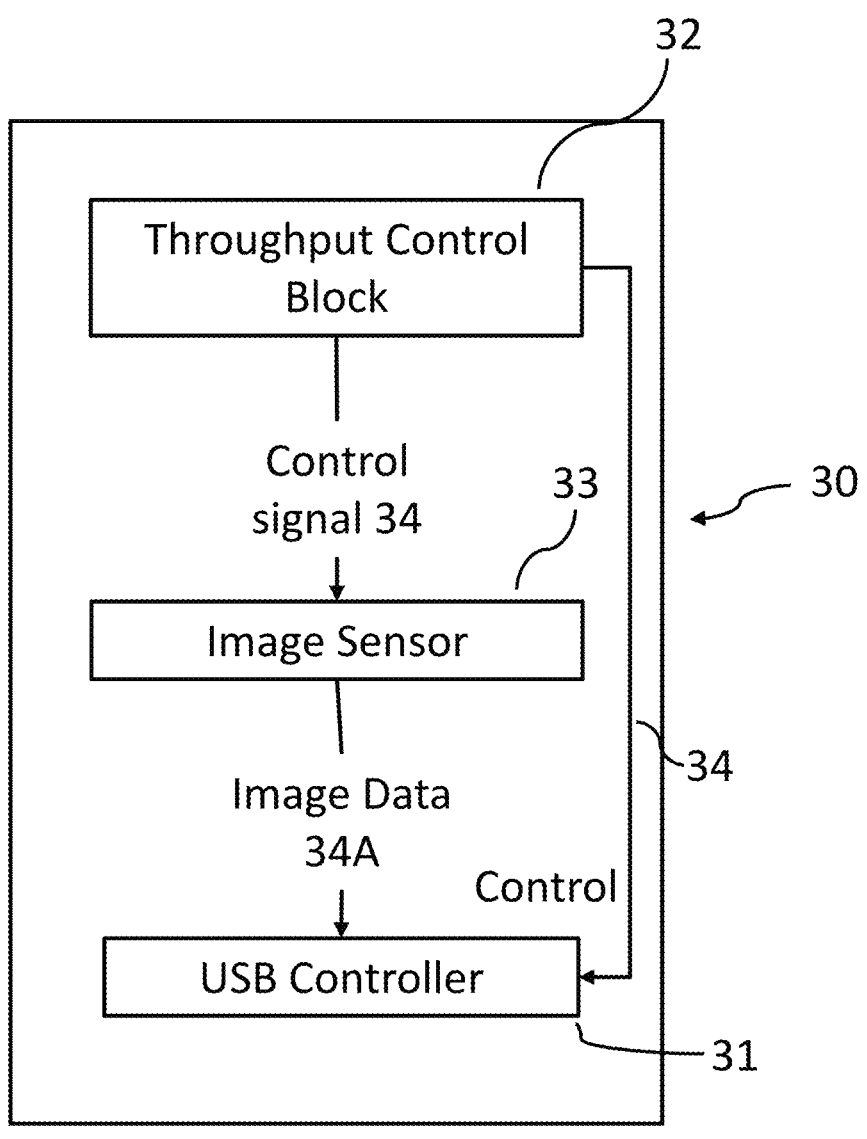
FIG. 4 is a representative hardware block diagram of the USB camera.

FIG. 4, the USB Camera (30) comprises following:

A USB Controller (31) that manages a transmission of USB interfaceable data packets from the USB camera (30) to the host unit (25). The image sensor (33) of the USB camera (30) sends to the USB controller (31) an image data or an image sensor output (34A), comprising of a control signal and video data on a serial or a parallel interface.

A throughput control block (32) that receives input/feedback (52) from a throughput analyzer computer program (26) and adjusts a throughput of the USB camera (30) accordingly as per the present invention.

An Image Sensor (33) that captures video data. The image sensor (33) is dynamically programmable via the throughput control block (32) of the USB camera (30), thereby adjusting its throughput management parameters including a pixel clock and a horizontal & vertical blanking line time to be able to vary the throughput as governed by the throughput analyzer computer program (26).

Figure 5:
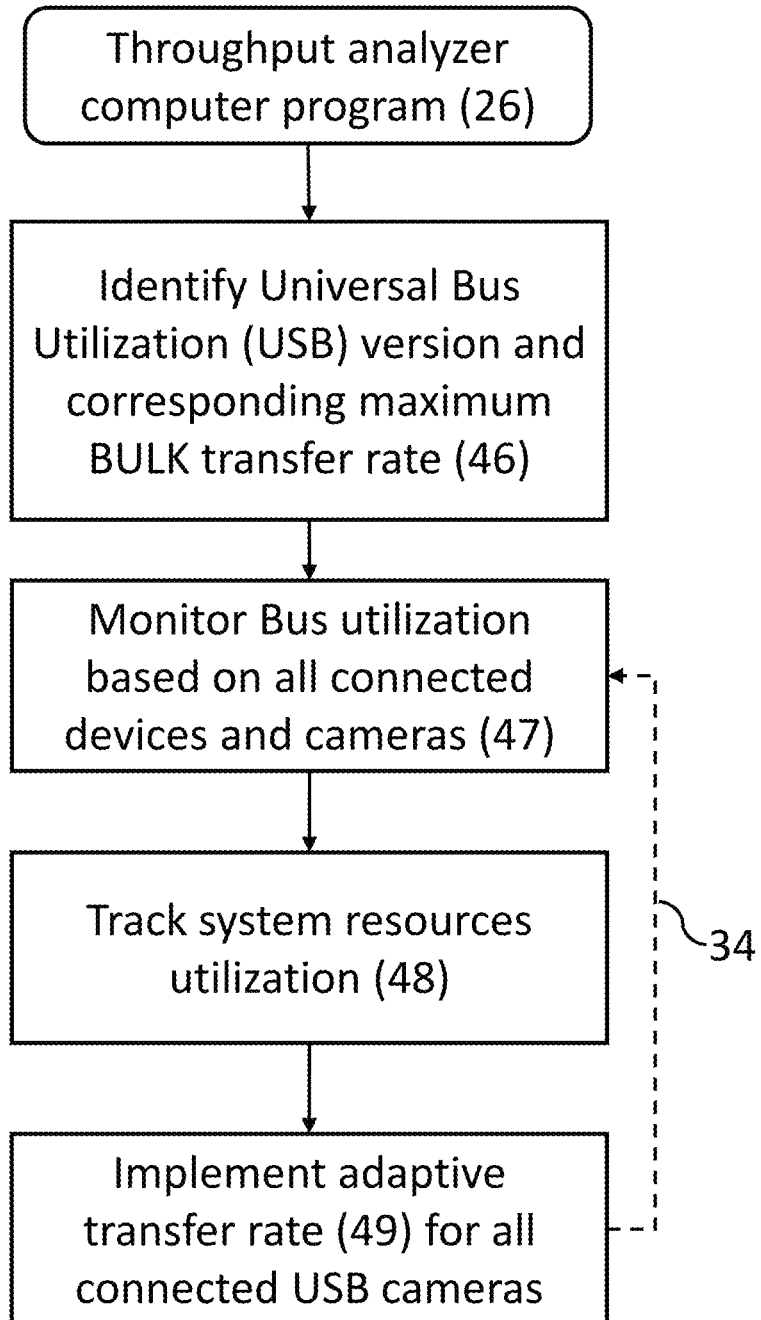
FIG. 5 is a flow diagram of a throughput analyzer computer program as per the present invention.
Figure 7:
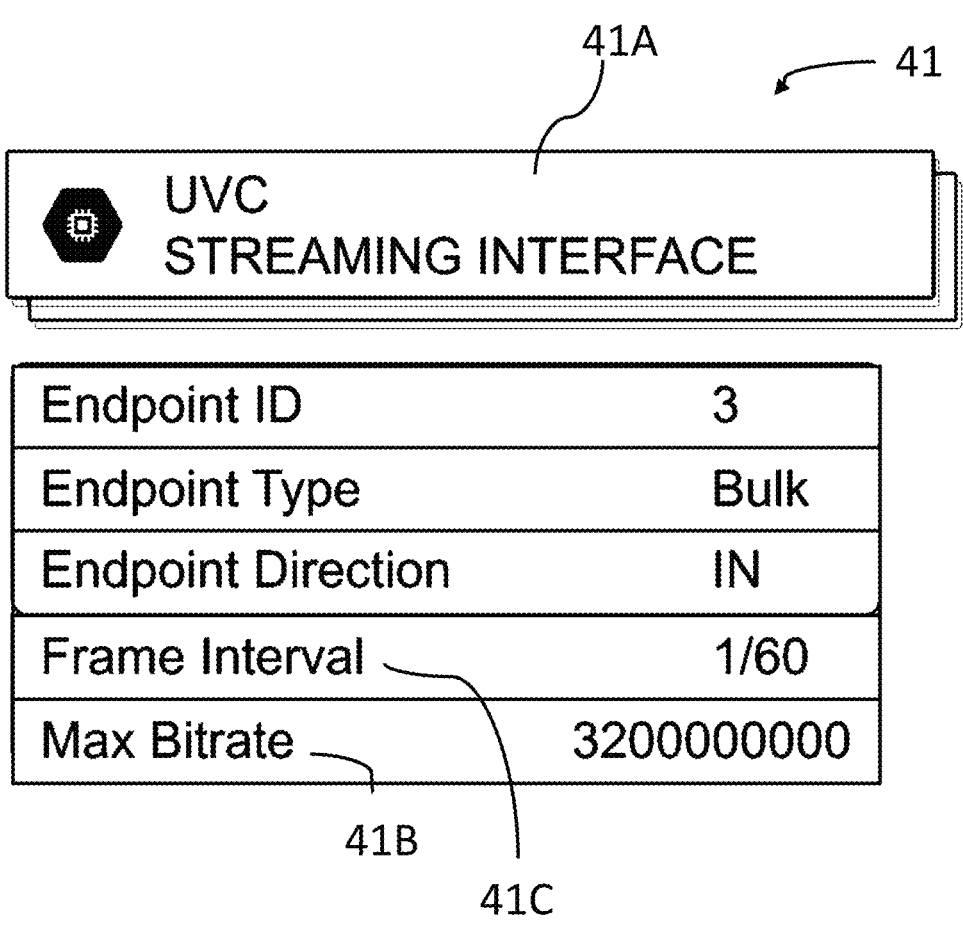
FIG. 7 is a configuration screen of streaming interface of the USB camera.

The optimizing system (100) as per the present invention having a USB streaming application (23) further comprises a plurality of inventive computer programs including the throughput analyzer computer program (26), FIG. 5; and involves following steps:

a) Configuring (46) USB Camera (30) with respect to host unit (25): Identifying the USB version supported and deployed by the host unit (25) and its maximum transfer rates for BULK transfers. BULK endpoint is configured in the USB camera (30, 30A) by selecting endpoint for a streaming interface (41A) in a device descriptor (41) which is part of the initial capabilities that is communicated from the USB camera (30, 30A) to the host unit (25) during an enumeration phase of the USB camera (30, 30A) and any other device. Additional configurations include bitrate (41B), frame interval (41C) etc. of the streaming interface (41A). FIG. 7.

b) Monitoring USB bus utilization (47): Assessing USB bus utilization by the host unit (25) considering impact of other connected devices that may be sharing the bandwidth of the universal serial bus.

c) Tracking system resources (48): Actively monitoring resources of the host unit (25) including CPU and memory usage during USB camera operation. If the host unit shows signs of struggle in processing the incoming data stream, the invention could adjust the camera's transfer rate, resolution, or frame rate to lessen the processing load.

Dotted line referenced 34 of FIG. 5 applies for the dynamic mode (90).

Figure 8:
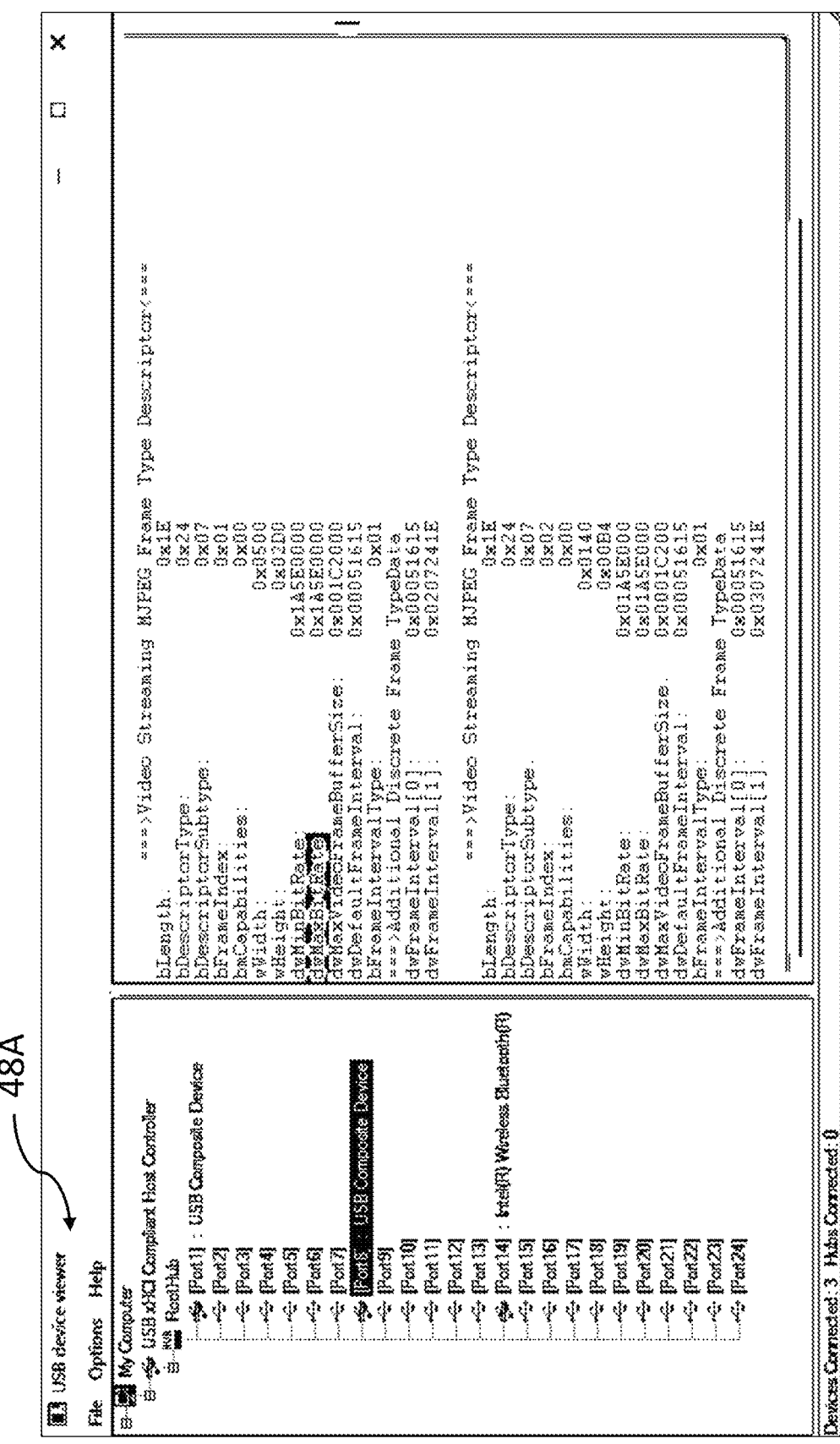
FIG. 8 is a screen shot of a Windows® tool.
Figure 9:
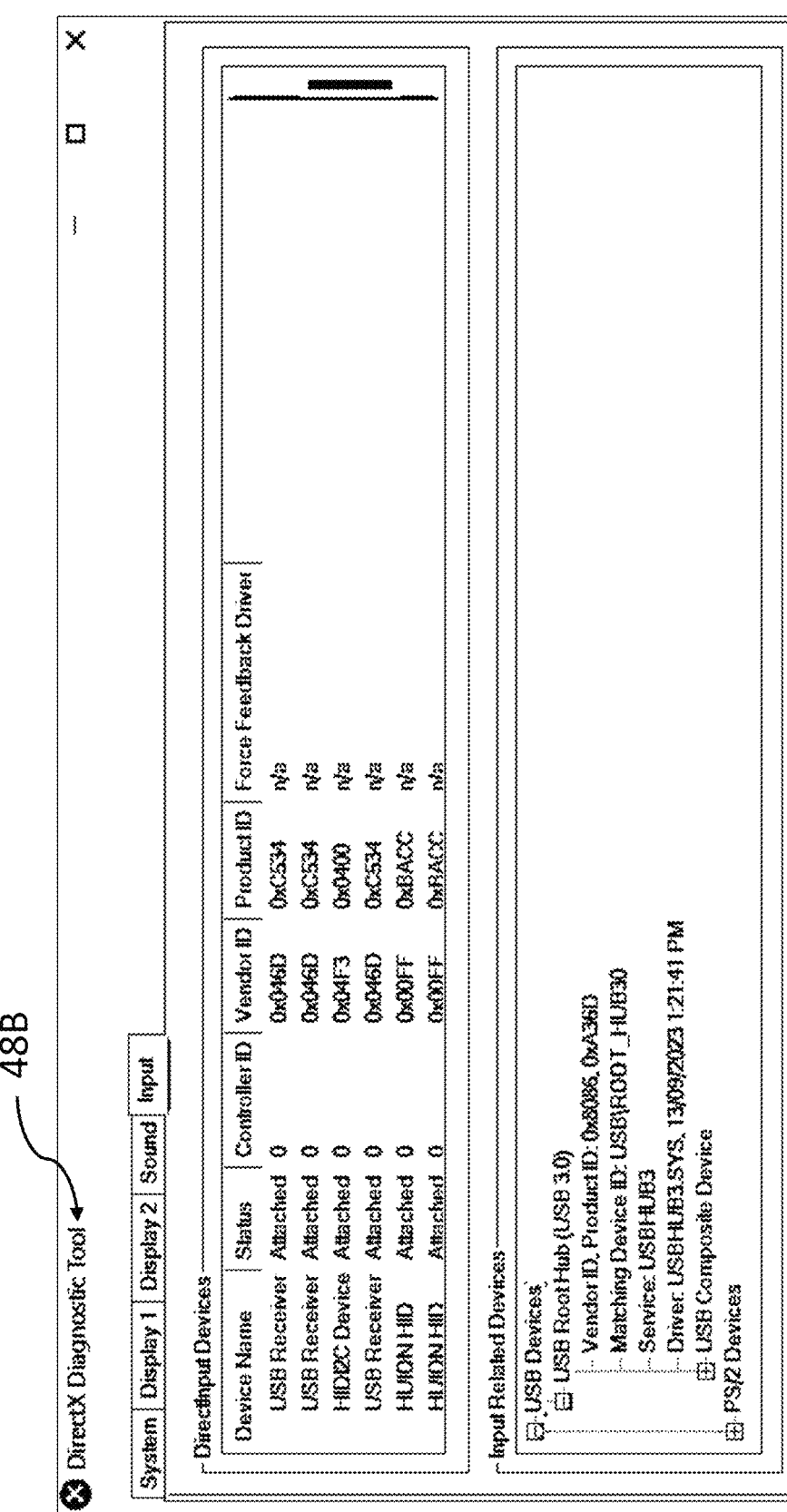
FIG. 9 is a screen shot of another Windows® tool.

Evaluating capabilities of the host unit, namely the monitoring of the bus utilization (47) and the tracking of the resources (48) of the optimizing system (100) is done through utility applications of the Operating System. FIGS. 8, 9, 10, in case of Windows, tools like USB device viewer (48A) and DirectX Diagnostic Tool (48B) are deployed to understand the number of devices connected currently and the host controller's capability. Similar information in Linux can be accessed through command line tools like lsusb (48C).

Current system capabilities can also be programmatically extracted through various system libraries available in both Windows and Linux as mentioned in the code snippets below:

Windows:

Total Physical Memory (RAM): #include "windows.h" #include "psapi.h"

DWORDLONG totalPhysMem=memInfo.ullTotalPhys;

CPU Usage: #include "pdh.h"

PdhCollectQueryData (cpuQuery);

Linux:

Total Physical Memory (RAM): #include "sys/sysinfo.h"

totalPhysMem*=memInfo.mem_unit;

CPU Usage: #include "sys/times.h" #include "sys/vtimes.h"

lastCPU=times (&timeSample);

lastSysCPU=timeSample.tms_stime;

lastUserCPU=timeSample.tms_utime;

Implementing adaptive transfer rate (49): Controlling the USB camera (30, 30A) by the throughput analyzer computer program (26) to dynamically or discreetly adjust its data transfer rate based on one time, on demand and real-time evaluations of resource utilization of the host unit (25) and current data transfer rate. By focusing on BULK endpoint, this invention takes advantage d) of this inherent flexibility. BULK endpoint interface does not limit the USB camera (30) to a fixed, negotiated bandwidth, but rather allows to utilize the full available throughput of the USB bus, subject to assessed data transfer rate.

This flexibility is especially beneficial when streaming from multiple USB cameras (30, 30A—FIG. 1A), as it allows for more effective utilization of the available bandwidth. Each USB camera (30, 30A) can adjust its data transfer rate according to the USB bus conditions, helping to maintain optimal performance across all USB cameras (30, 30A) without the need for fixed bandwidth reservations, for which isochronous interface becomes mandatory!

Figure 11:
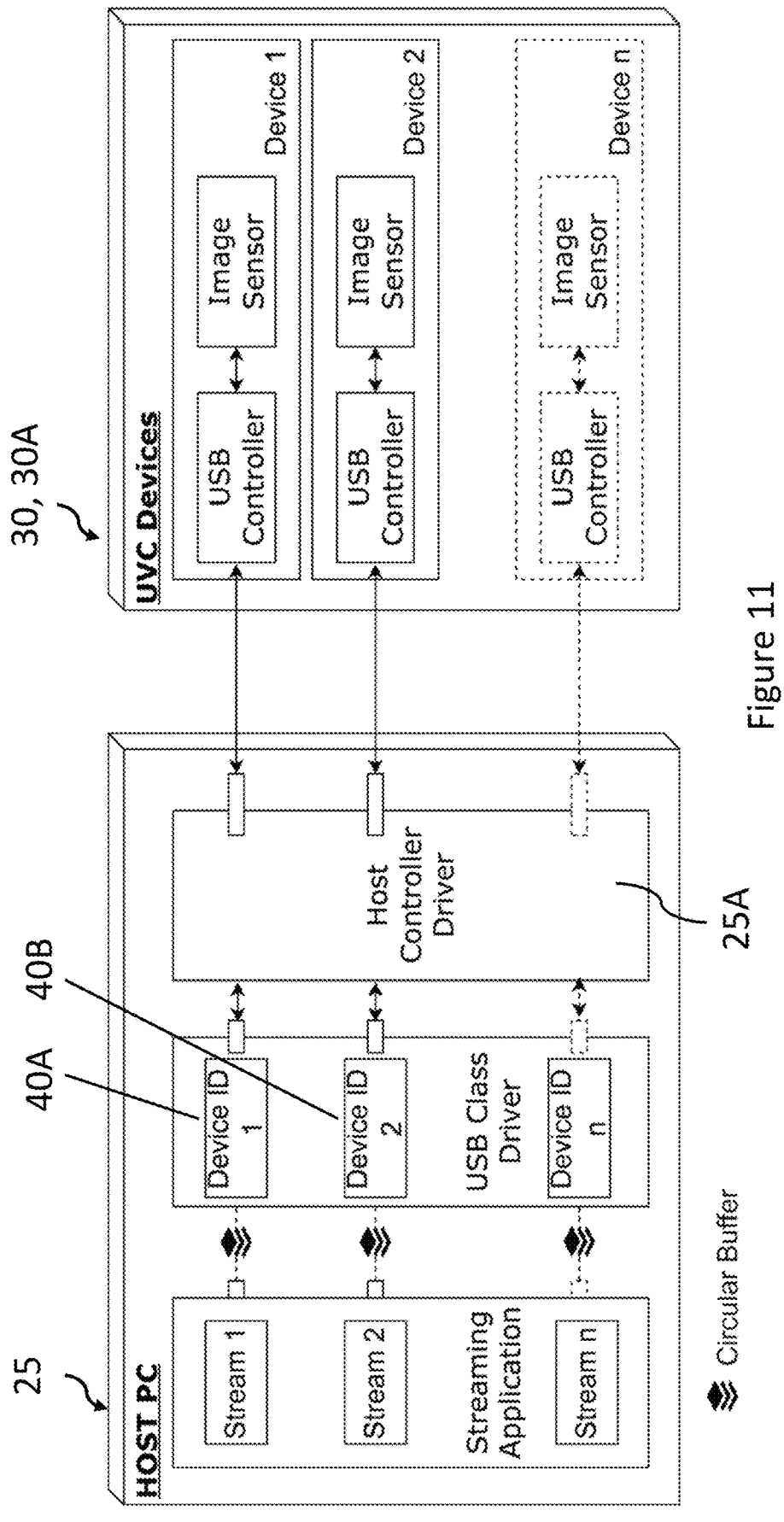
FIG. 11 is a block logic diagram of a plurality of USB cameras connected to the host unit.

When the optimizing system (100) has more than one USB camera sending data (at different rates) to a common circular buffer, the respective individual data chain is distinctly identified so there is no obvious mix. The USB cameras (30, 30A) when connected to the host unit (25) are routed through a controller driver (25A) of the host unit (25), wherein each controlled device is typically assigned a device identification number or device ID (40A, 40B, 40C) with a unique path for the other driver layers to access a particular device. The circular buffer memory device (35) is situated between the USB camera(s) and the streaming application of the host unit (25). The streaming application identifies or assigns the memory location for each device which is then monitored by the throughput analyzer computer program (26). FIG. 11.

Figure 6:
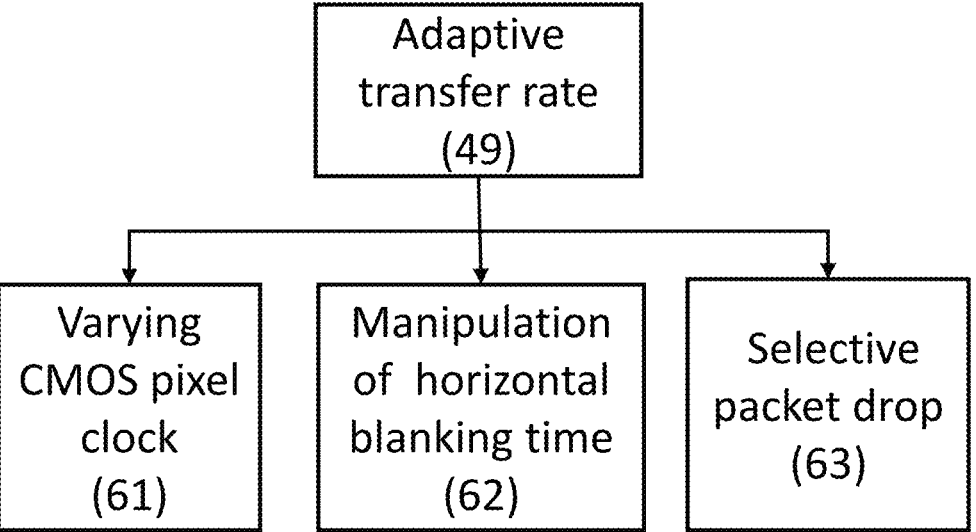
FIG. 6 is a step diagram of adaptive transfer rates techniques deployed in the present invention.

FIG. 6, the adaptive transfer (49) of throughput analyzer computer program (26) as per the present invention deploys or integrates one or more of the following optimization strategies:

varying the CMOS pixel clock (61), horizontal blanking time manipulation (62), and or selective packet drop (63) of frames (71, 71A) providing adaptive data transfer rate (49) in response to capabilities of the host unit (25).

There is a continuous monitoring, feedback and deployment of an adaptive transfer rate (46) in the dynamic mode (90) while it is one time or on demand in the static mode (80). Further a buffer fill time is deployed as further described below.

The Throughput Analyzer computer program (26) of the present invention, residing in the Host unit (25) plays a crucial role in predicting a potential congestion in the USB BULK endpoint pipeline leading to the host unit (25), by tracking a number of free buffer zones available in a circular buffer memory device (35) incorporating a circular buffer architecture utilized for the data transfer.

Figure 12:
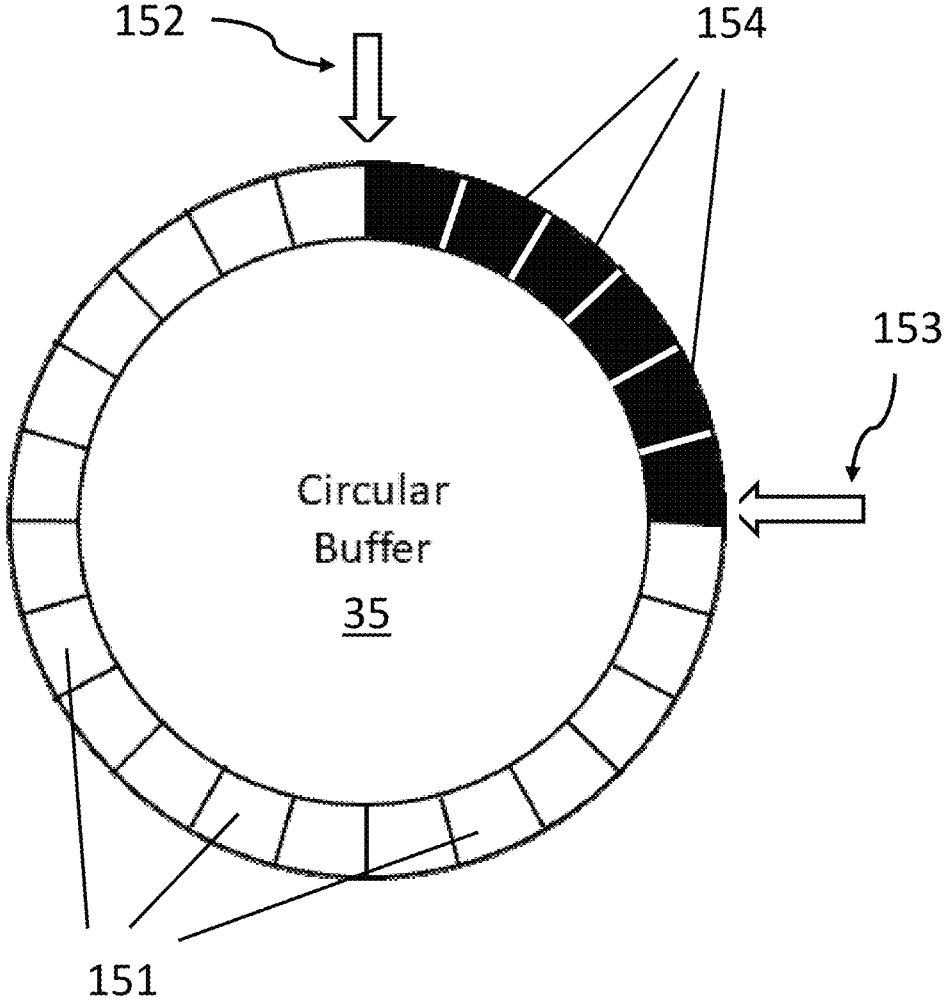
FIG. 12 is an architecture diagram of the circular data buffering.
Figure 13:
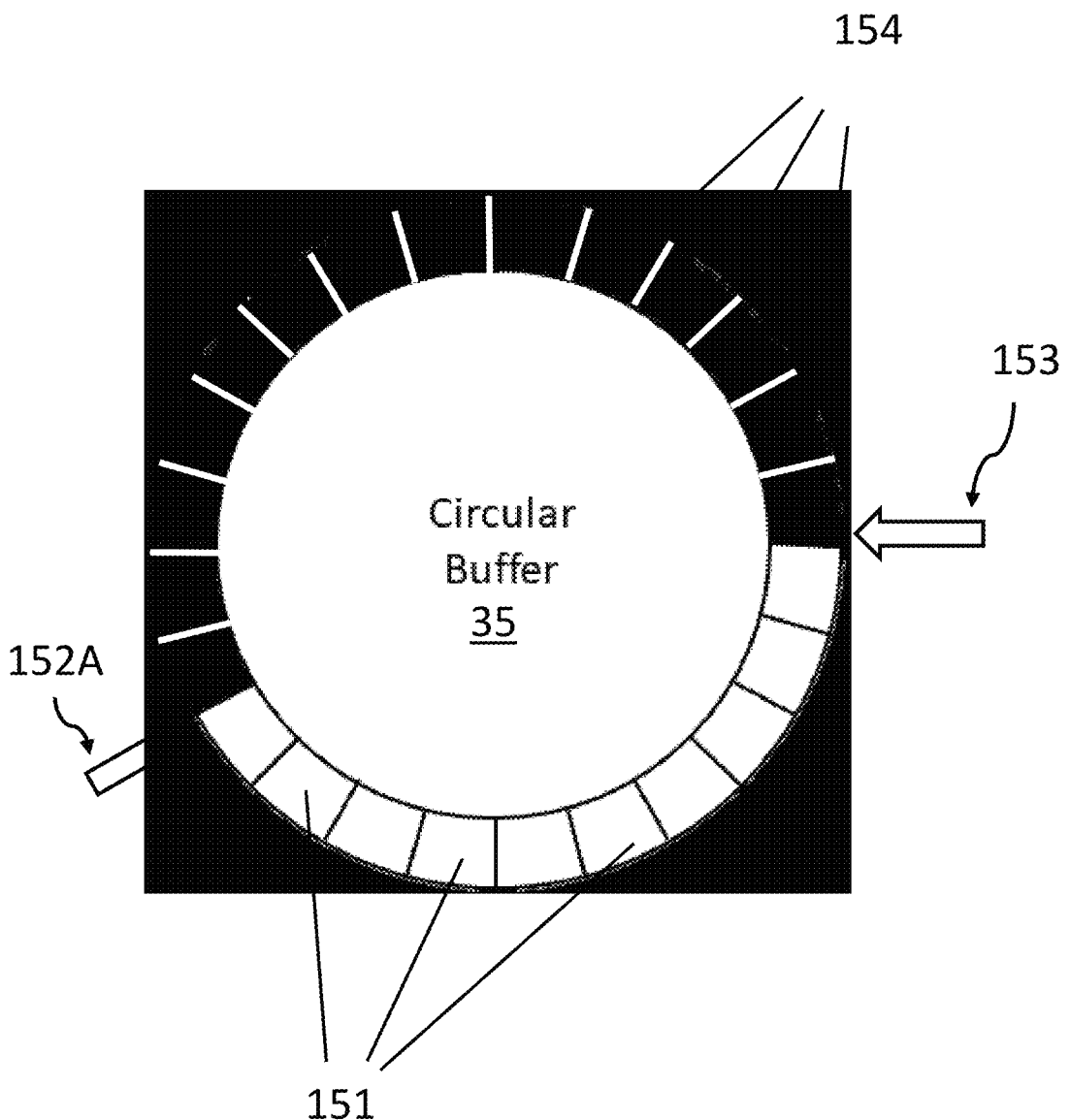
FIG. 13 is the architecture diagram of the circular data buffering with a reduced free buffer zones.
Figure 14:
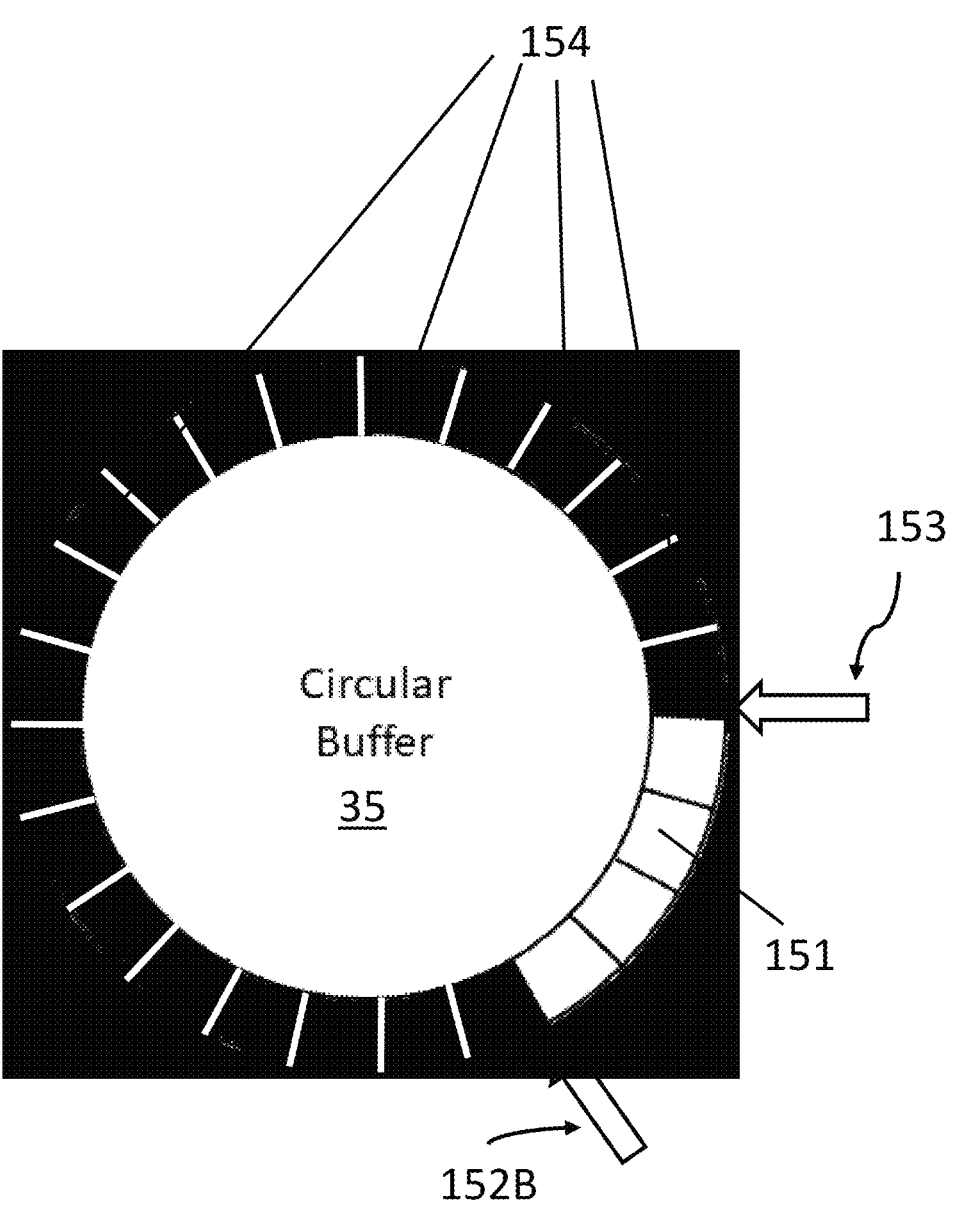
FIG. 14 is the architecture diagram of the circular data buffering with a further reduced free buffer zones.

FIGS. 12, 13, 14, in the circular buffer architecture, a plurality of data packets (154) are stored and retrieved in a plurality of quantifiable buffer zones that in effect form a circle. The data flows from a source, here the USB camera (30) into the quantifiable buffer zones, eventually to a sink, here the Host unit (25). Keeping track of the free buffer zones (151) between the source and the sink provides a quantitative estimate into the system's throughput capabilities and utilization levels. Data overflow occurs when the free buffer zones between a source pointer (152, 152A, 152B) and a sink pointer (153) nears zero.

If the number of free buffer zones (151) is relatively large, it indicates that the sink is successfully retrieving data packets (154) faster than or at the same rate as they are being put in by the source, and there is room for more data, here video frames. This signals no impending congestion. However, if the free buffer zones count (151) starts to decrease continuously, it suggests that the sink is struggling to keep up with the source. This situation, if not managed, would eventually lead to buffer overflow, signalling potential congestion.

To predict the congestion, the present invention uses multiple "threshold number" for the optimizing system (100) to take decision on a packet drop rate. Depending on the current source (152, 152A, 152B) and sink (153) pointer positions, the free buffer zones (151) between them are calculated. As a preferred embodiment, three different threshold numbers namely "Low Risk threshold", "Medium Risk threshold" and "High Risk threshold" are configured.

At any point of time, when the free buffer zone count (151) is less than a Low Risk threshold T1, then the packet drop rate (PDR) is set to be PDR1. Likewise, if the free buffer zone count is below the Medium Risk threshold T2, then the packet drop rate is set to be PDR2 and if, below the High Risk threshold T3, then it is set to be PDR3. By increasing this PDR step by step, it is intended to keep the free buffer zone count between the source and the sink pointer to be greater than the Low Risk threshold.

For example, if the circular buffer has 100 buffer zones and the T1, T2 and T3 are set at 40, 20 and 10 respectively and PDR1, 2 & 3 are chosen to be 30%, 50% and 80%, implies that when distance value is below T1-40, the Packet Drop rate PDR1 is set and 30% of the packets are dropped. If the distance value deteriorates and still goes below T2-20, the PDR2 is set and 50% of the packets are dropped. And if the free buffer zone count is too low and below the High risk threshold T3, the PDR3 is set and 80% of packets are dropped.

The intention of management of packet drop rate (PDR) is to get the free buffer zone count back to safe operating region which is a value higher than the low risk threshold. The packet drop strategy is a short term solution to avoid overflows in the pipeline.

The throughput analyzer computer program (26) monitors a buffering time taken for a data packet to travel from the source to the sink for fine tuning the current USB data transfer rate. This additional measurement and control provides a more accurate and comprehensive information of the performance of the optimizing system (100), enabling the present invention to make more accurate predictions about potential congestion and facilitating timely throughput adjustments to maintain optimal data flow.

Based on the throughput analysis input sent by the throughput analyzer computer program (26), the throughput control block (32) is configurable for at least three modes to control outgoing data from the USB camera (30), as below:

1. varying the pixel clock (61) of the image sensor (33)
2. manipulating the horizontal blanking line time (37) of the image sensor (33)
3. exercising the selective packet drop (63) of frames (71, 71A)

Figure 15:
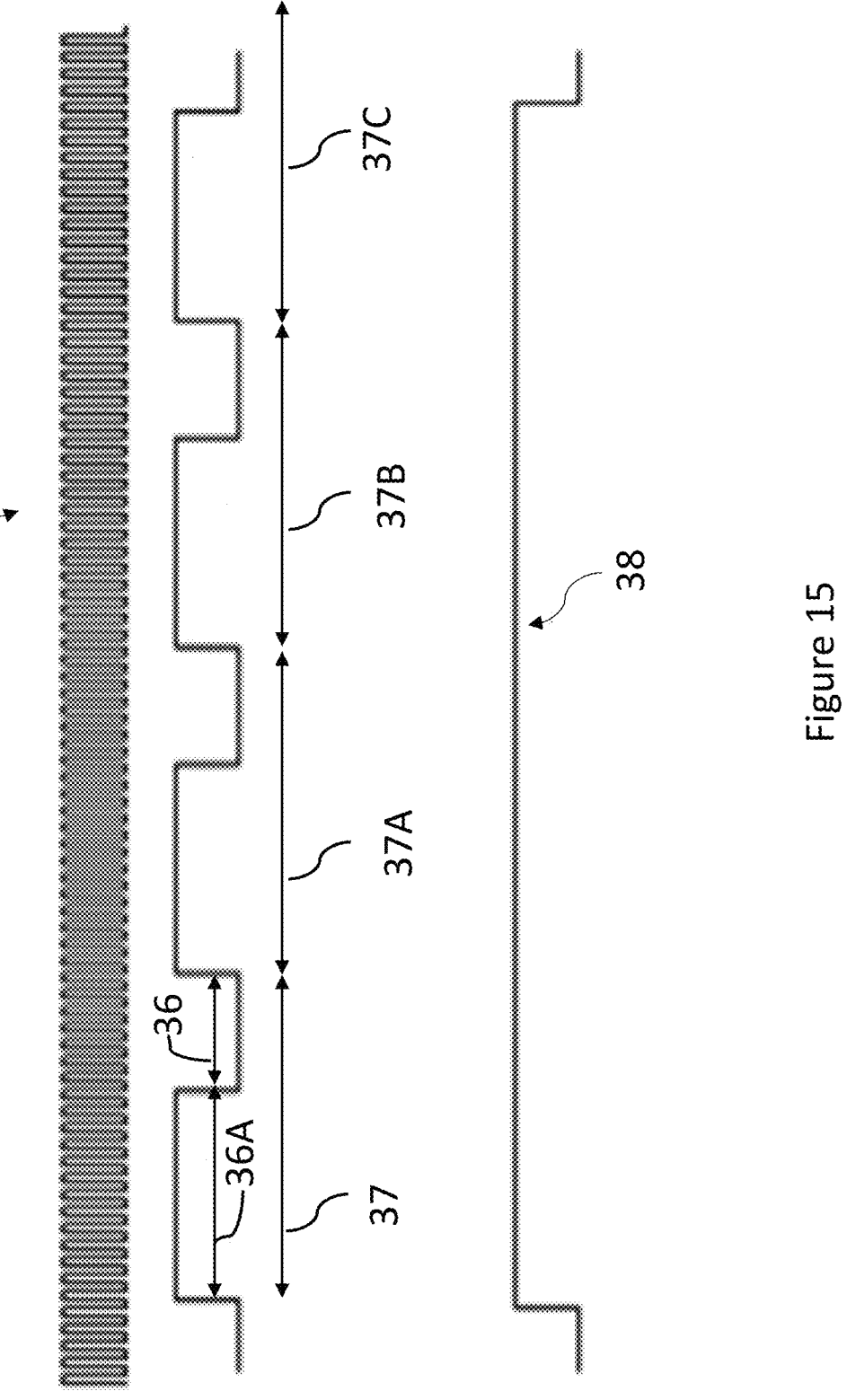
FIG. 15 is a timing diagram of a horizontal blanking.

Pixel Clock Control (61):

The image sensor (33) typically incorporates a complementary metal oxide semiconductor (CMOS). The pixel clock (61) of an image sensor (33) is essentially a clock of the semiconductor crystal and can be understood analogous to a heartbeat of an image capturing process. CMOS clock coordinates sampling of individual pixels for conversion into a digital signal and thus is known as pixel clock (61). FIG. 15, the faster a frequency, that is number of pules per unit time, of the pixel clock (61), the quicker the pixels are sampled, resulting in higher data transfer rates. The optimizing system (100) as per the invention dynamically adjusts the the pixel clock speed or pixel clock (61), in the image sensor (33) based on the host unit's capabilities and the available USB bus bandwidth as assessed by the throughput analyzer computer program (26). By doing so, the data transfer rate is aligned with the throughput capability of the host unit (25), leading to an efficient utilization of available resources and preventing frame drops or data congestion.

Horizontal Blanking Line Time Control (62):

The horizontal blanking line time of an image sensor (33) refers to a time period it takes for the image sensor (33) to read out a one line of pixels. Particularly, "blanking" time is the GAP between end of previous line and start of next line. Adjusting the "GAP" time effectively alters the frame rate (assuming no decrease in pixel clock) and consequently the data transfer rate. This technique is also termed as horizontal blanking time manipulation. Longer "GAP" times result in longer line time and consequently, a lower frame rates and hence, lower data transfer rates. FIG. 15, illustratively, a read time (36A) and a Gap time (36) makes a line time (37). Four horizontal lines (37, 37A, 37B, 37C) make a Frame (38) of a hypothetical 4-line image. In this mode, the invention dynamically adjusts the gap time (36) from each line time (37, 37A, 37B, . . . ) of each frame (38) of the image sensor (33) based on real-time analysis of the host unit's capabilities and USB bus utilization. This ensures optimal data transfer rates and prevents overloading the host unit or underutilizing the available bandwidth.

The frequency of the Pixel clock (61) and the line time (37) are altered by the throughput control block (32) in the USB camera (30, 30A). The image sensor (33) is connected through an I2C or a serial peripheral interface (SPI) (34) to the throughput control block (32) which is a micro controller chip inside the USB Video Class (UVC) device. The throughput control block (32), after the computation of line time or pixel clock frequency required for the targeted throughput, configures the corresponding Line Time/pixel clock frequency in designated configuration registers of the image sensor (33). Information about designated configuration registers, which is essentially an address usable by a computer program, is available in documentation of hardware suppliers.

Figure 16:
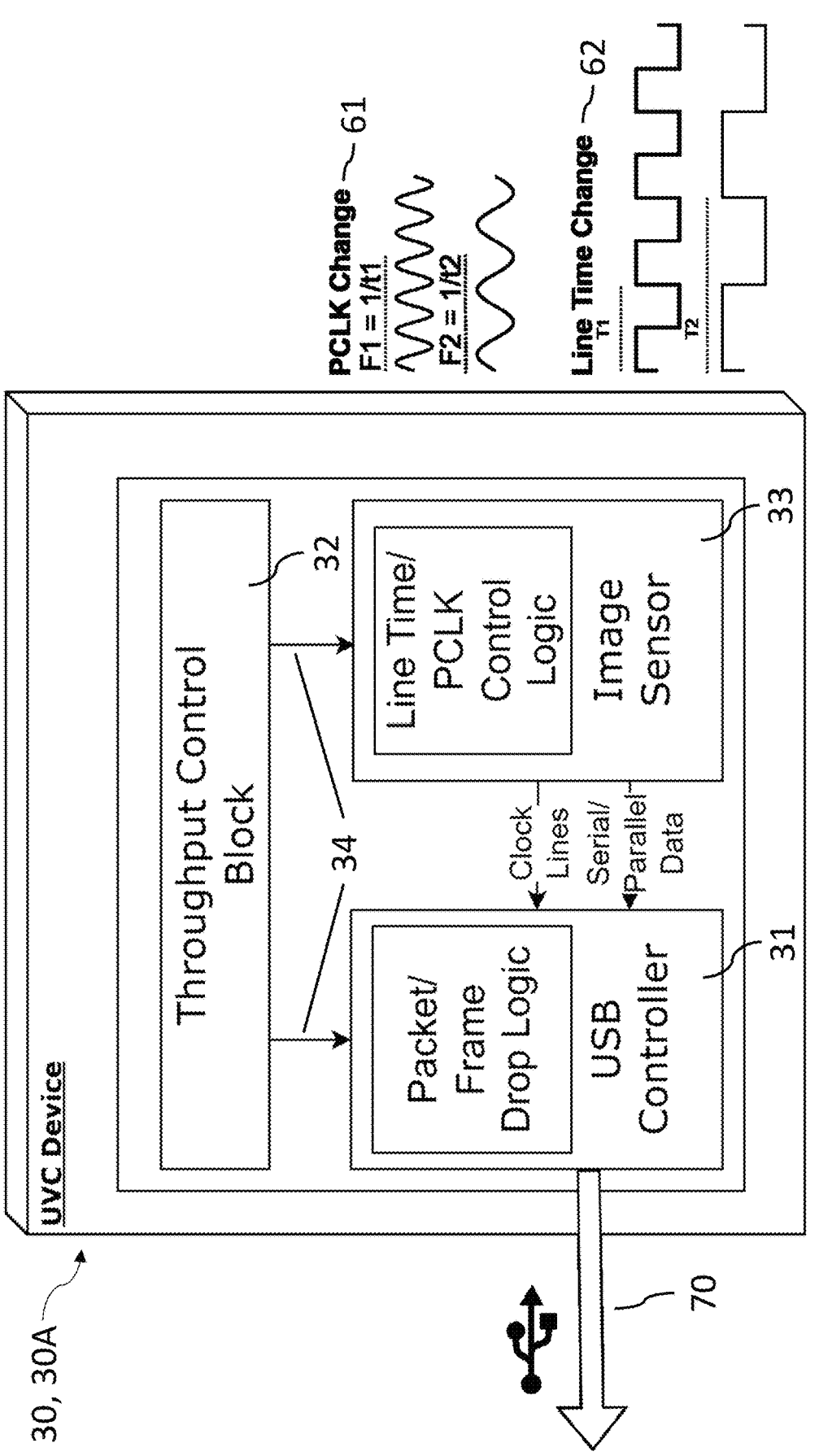
FIG. 16 is a block logic diagram of pixel clock control and horizontal blanking time control in a USB camera.

FIG. 16, an example representation of pixel clock frequency control (61) from frequency F1 to F2 and horizontal blanking line time control (62) from time T1 to T2.

Figure 17:
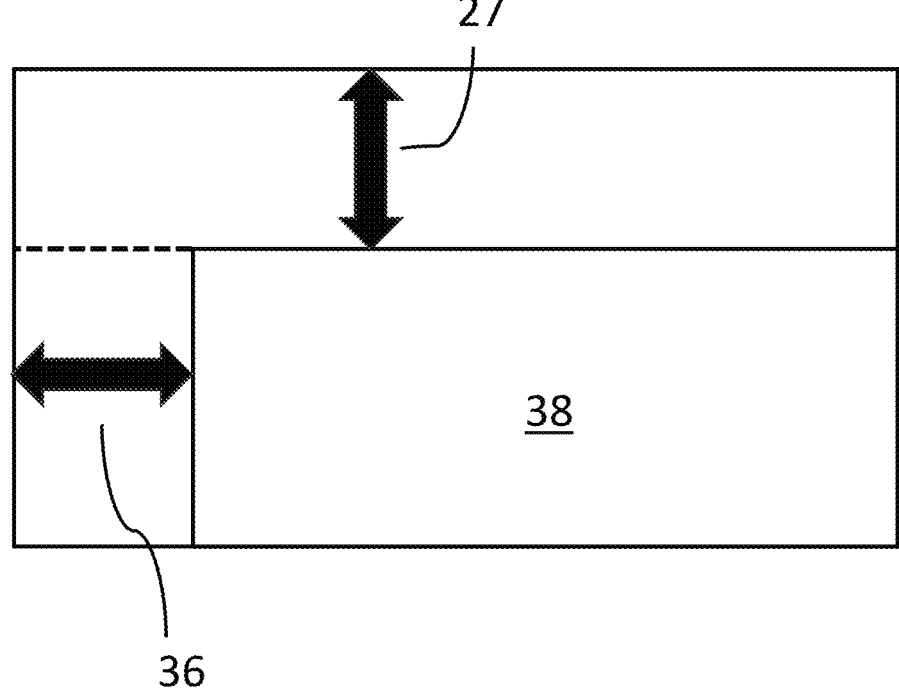
FIG. 17 is a representative diagram of a horizontal blanking time and a vertical blanking time with reference to a frame of a video.

FIG. 17, a vertical GAP time (27) of a frame (38) is manipulatable likewise.

For the above two approaches, the control block uses the below relation to actively arrive at specific pixel clock or line blanking time to be calculated.

USB throughput available=X Mbps (Found through Throughput analysis step)

USB transfer buffer size=USB Transfer packet size*Burst count (Can be computed based on the USB bus type and transfer type)

Buffer fill time (Host end)=USB throughput available/USB transfer buffer size.

After finding the buffer fill time from the host throughput, the camera's line time can be calculated from the camera side using below relation.

Buffer fill time=Lines in one buffer*Line time

Lines in one buffer=USB transfer buffer size/Line size

Since in above equation, Line time is the only unknown, it could be found by relation, Line time=Buffer fill time/Lines in one buffer For Line blanking control approach, we can modify the blanking directly by the below relation, since Line time=Line valid time+Line blanking time
Line blanking=Line time−Line valid time.

For Pixel clock control approach, we can find the Pixel clock to be modified by the below relation,
Pixel Clock=Number of pixels per line/Line time Depending on the flexibility of control we have over the image sensor, any of the above two methods or a combination shall be used to efficiently control the throughput.

Selective Packet Drop (63)

There can be situations when data transfer or throughput capabilities of the host unit (25) drop or the USB bus utilization increases significantly, making it difficult to maintain the data transfer rate without causing frame drops. This may be considered a different form of data 'rate control' which exists by controlling the data accepted or dropped from the image sensor (33).

In such scenarios, instead of attempting to transmit all data and causing substantial and involuntary packet or frame drops or data congestion, this mode of the invention strategically drops frames at the source. This decreases the data transfer rate, thereby preventing the USB bus from being overwhelmed and ensuring a smoother video stream, albeit at a lower frame rate. This frame drop strategy is a proactive approach to managing data throughput and maintaining system performance in challenging conditions.

Figure 18:
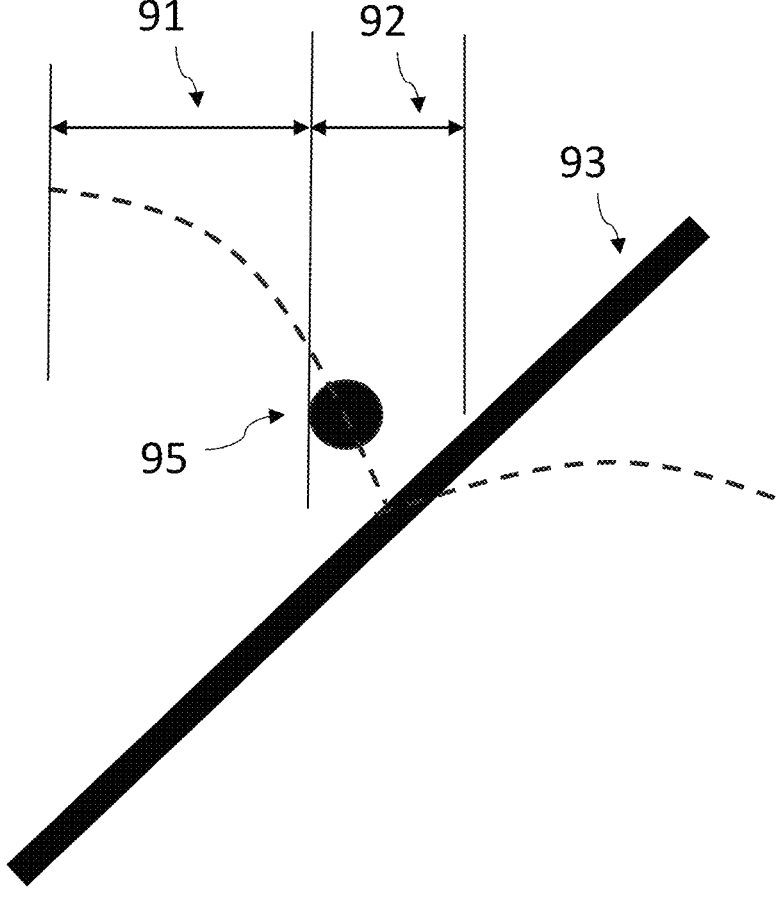
FIG. 18 is a representation a critical near identical and a non-critical near identical frames.

Strategic drop (63) caters to several situational requirements. Illustratively,

FIG. 18, non-critical near identical adjacent frames (91) are dropped when contents do NOT warrant micro-detailing for decision making. Illustratively, a dancing woman, a panoramic view of nature, a dog barking, or a moving tennis ball (95) in a normal course would comprise non-critical near identical frames (91) of game, may be not requiring micro-details by a viewer/user.

Critical near identical adjacent frames (92), which are essentially critical adjacent frames with apparently un-noticeable relative visual difference, are NOT dropped when contents warrant micro-detailing of the order of micro seconds including decision making based thereon—judging a tennis ball (95) in, on or outside a line (93), a batsman reaching before or after cricket ball, etc. The decision making could be with reference to a prescribed object (93), which is a boundary line of a field or a playing area or a limiting crease in cricket!

Critical adjacent frames are definable specific to different situations and applications. Further illustratively, while frames capturing a relative movement of fingers of the dancing movement may be non-critical from performance evaluation perspective, the same relative movement with reference to woman's eyes could become critical, if it is a classic dance of precision! The dancing woman's eyes, therefore, become a prescribed object. The prescribed object itself could be a moving object.

Figure 19:
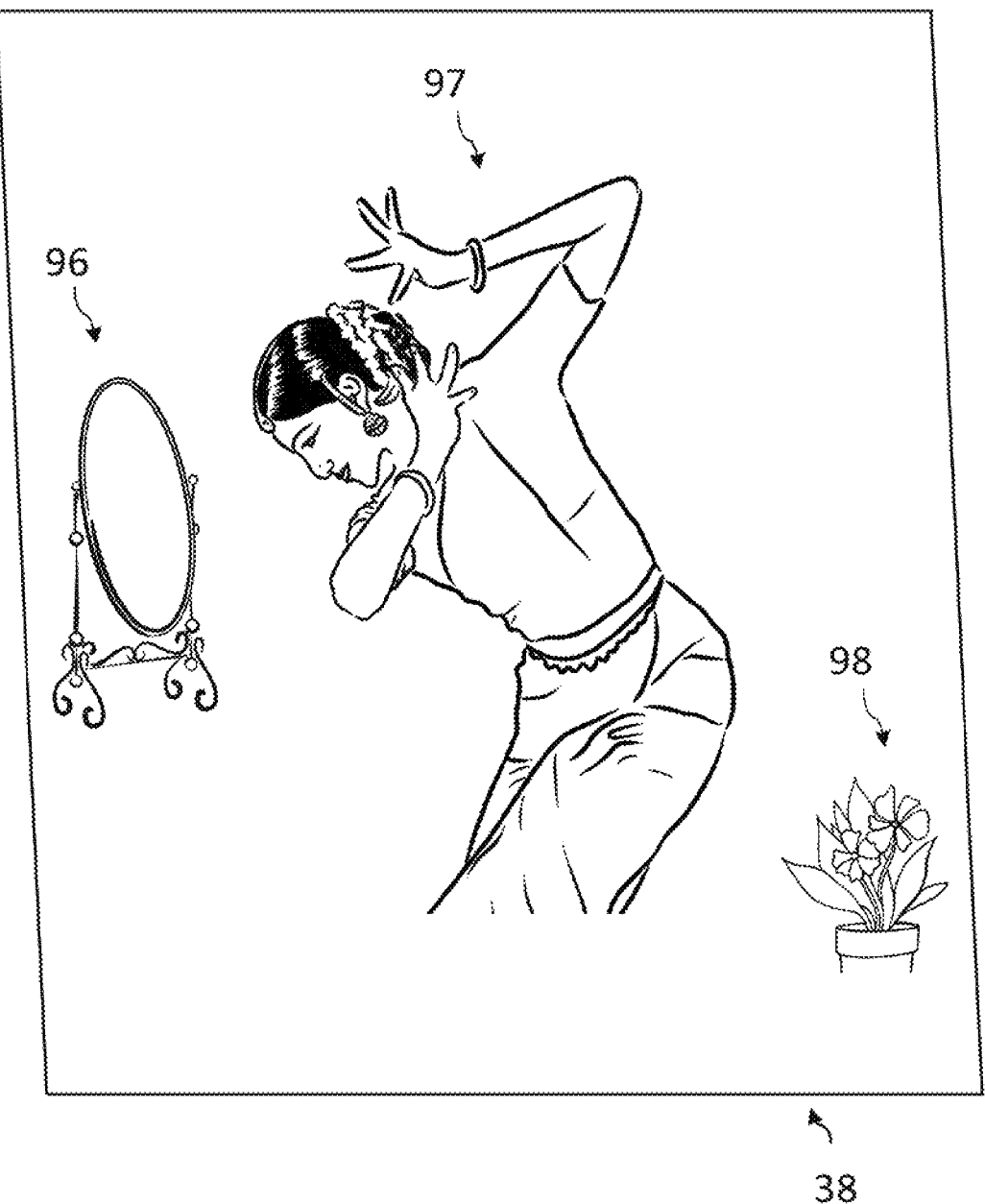
FIG. 19 is an illustration of a non-critical near frames.

FIG. 19, non-critical near identical adjacent frames (38), which are essentially non-critical adjacent frames with apparently un-noticeable relative visual difference, are either not referenced at all or referenced with a plurality of generic objects like near identical frames (38) of a dancing woman (97), with reference to a mirror (96), a flower pot (98) etc., where no micro-decision making is required.

Selective frame drop is a prudent option where the incoming data from the image sensor (33) cannot be or cannot adequately be controlled through the Pixel clock control or line time control strategies. Selective frame drop is achieved through instructing the USB controller (31) of the USB camera (30, 30A) by the throughput analyser computer program (26) directly without changing any parameter of the image sensor (33).

For assessing criticality of adjacent frames, a position variation of contents in a frame is directly measured using training data and convolutional neural network (CNN). As a variation, the position variation is indirectly measured by monitoring brightness, contrast, or color changes from previous frame to next frame.

Figure 20:
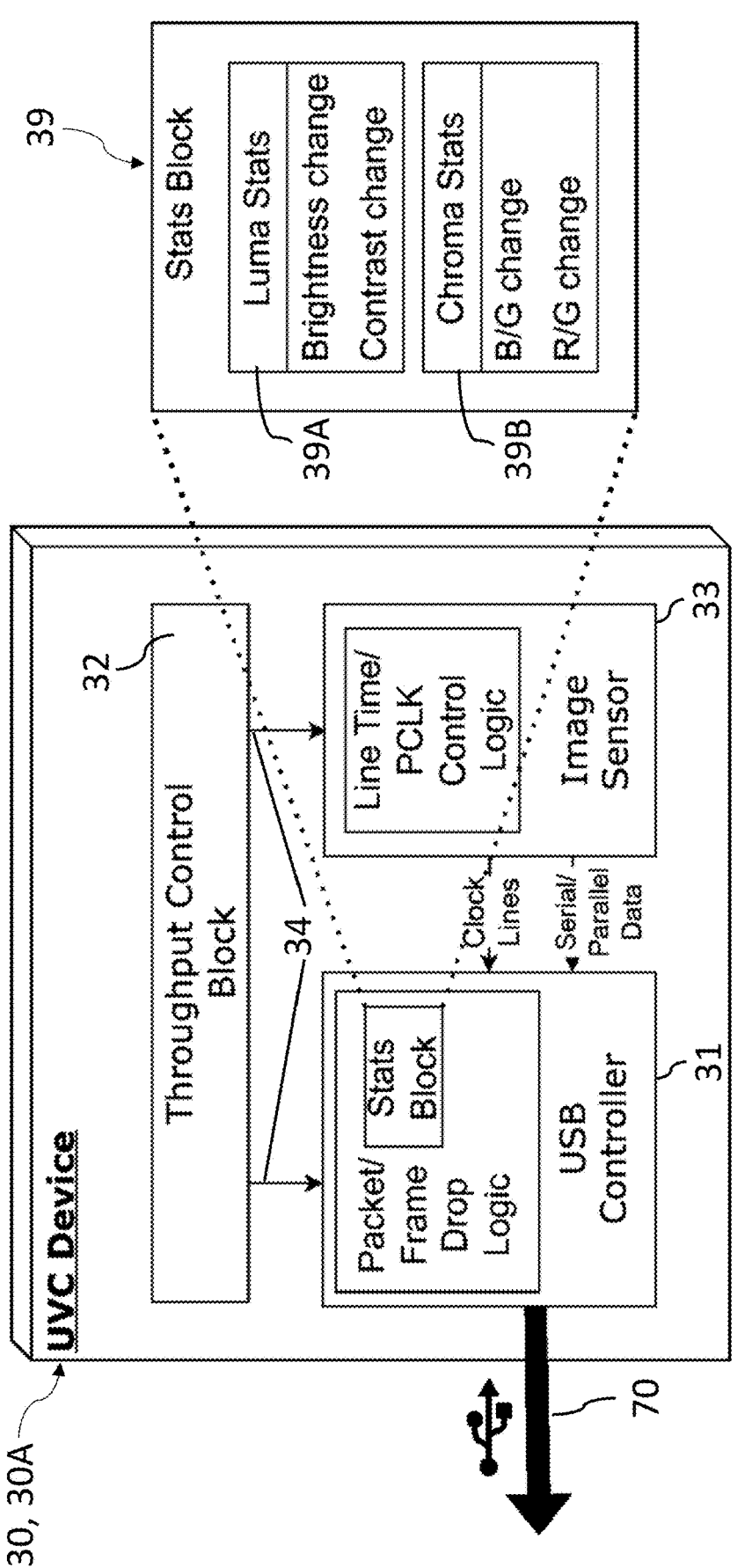
FIG. 20 is a block diagram of a stastical block in a USB camera.

FIG. 20, an indirect assessment of critical and non-critical frames is therefore by monitoring an optical aspect of scene variation in the images as further described below, by monitoring an image statistics from a statistics block (39) of the USB Camera/UVC Device (30, 30A).

A scene change or a position variation is estimated at a uni-pixel level or a multi-pixel level or a frame level. The uni-pixel level comprises comparing changes in each pixel, while multi-pixel level estimation comprises comparing the changes on a prescribed batch of multiple pixels. Illustratively, a 1000×1000 resolution image is split into 100 batches of 100×100 pixels each. For each batch, statistics values are averaged and only a single value is considered for comparison. The same comparison is done on entire frame where the entire frame is averaged to a single value.

Parameters for validating scene changes in a preferred embodiment are

Luma based (39A) (brightness and contrast) and
Chroma based (39B) (color ratios).

For a brightness statistics based scene change detection, difference in brightness level of previous frame the current frame is evaluated. These changes are validated over a batch of pixels to arrive at an average brightness of the corresponding batch or the entire frame. The same applies to other parameters.

Yet another selective packet drop (63) is a periodic operation implying if there is a congestion detected in the universal serial bus (71), then the current frames are dropped without criticality assessment.

Above explained adaptive transfer rates (49) are deployed in different combinations and for the static mode (80) or the dynamic mode (90).

Terms universal serial bus, USB bus and USB are used interchangeably. Terms USB camera and UVC device are used interchangeably. Terms pixel clock and PCLK are used interchangeably.

I claim:

1. A system to optimize video streaming of a plurality of universal serial bus (USB) cameras, streaming via a universal serial bus (USB) having a maximum throughput in a direction, the system comprising:

a USB camera capable of capturing video data, having,
a throughput control block for adjusting the throughput of the USB camera, having an image sensor capturing video data according to a throughput control signal, connected to the image sensor and providing thereto an image sensor control signal,
the image sensor providing, in response to said image sensor control signal from said throughput control block, an image sensor output of said image sensor captured video data adjusted according to throughput management parameters having at least one of a variable complimentary metal-oxide-semiconductor pixel clock, a controllable horizontal blanking time, and a selective packet drop, and
a USB controller, having a statistics block, connected to receive said image sensor output and to receive a streaming control signal from said throughput control block, and providing a USB output; and
a host unit including,
a USB application responsive to said USB Camera USB output, and
a throughput analyzer which provides said throughput control signal to said throughput control block, in response to said USB output, to selectively control at least one of said throughput control block to provide said USB output no greater than said USB maximum throughput.

2. The system to optimize video streaming of the plurality of USB cameras as claimed in claim 1, wherein the throughput of the USB camera is varied by the throughput control block varying the CMOS pixel clock of the USB camera.

3. The system to optimize video streaming of the plurality of USB cameras as claimed in claim 1, wherein the throughput of the USB camera is varied by the throughput control block varying the horizontal blanking line time.

4. The system to optimize video streaming of a plurality of USB cameras as claimed in claim 1, wherein the throughput of the USB camera is varied by the throughput control block dropping a plurality of frames.

5. The system to optimize video streaming of a plurality of USB cameras as claimed in claim 1, wherein the throughput of the USB camera is varied by the throughput control block configurably dropping a plurality of non-critical adjacent frames while a plurality of critical adjacent frames are retained.

6. The system to optimize video streaming of a plurality of USB cameras as claimed in claim 5, wherein the plurality of USB cameras is comprised of a USB camera or a USB Video Class (UVC) device or a combination thereof, wherein the plurality of critical adjacent frames are referenced with a prescribed object, and identified by monitoring an image statistics from a statistics block of the USB camera or a USB Video Class (UVC) Device.

7. The system to optimize video streaming of a plurality of USB cameras as claimed in claim 1, wherein the throughput analyzer computer program continuously monitors a USB bus throughput and provides real-time updates of an available bandwidth of the USB bus characterized as real-time USB bus throughput.

8. The system to optimize video streaming of a plurality of USB cameras as claimed in claim 7, wherein the throughput analyzer computer program monitors an ongoing video streaming data from the USB camera and compares against the real-time USB bus throughput, wherein a difference thereof is provided as a continuous feedback to the throughput control block of the USB camera.

9. The system to optimize video streaming of a plurality of USB cameras as claimed in claim 1, wherein the throughput analyzer computer program assesses a USB bus throughput on a demand from the throughput control block to communicate available bandwidth.

10. The system to optimize video streaming of a plurality of USB cameras as claimed in claim 9, wherein the throughput analyzer computer program enables a static test data from the USB camera and validates multiple data rates, wherein a data rate without an involuntary packet drop is provided as feedback to the throughput control block of the USB camera.

11. The system to optimize video streaming of a plurality of USB cameras as claimed in claim 1, wherein the throughput analyzer periodically monitors a USB bus throughput and provides updates of an available bandwidth of the USB.

12. The system to optimize video streaming of a plurality of USB cameras as claimed in claim 11, wherein the throughput analyzer computer program enables a static test data from the USB camera and compares against the USB bus current throughput sent from the USB camera device, wherein a difference thereof is provided as feedback to the throughput control block of the device.

13. The system to optimize video streaming of a plurality of USB cameras as claimed in claim 1, wherein the system further comprises a circular buffer memory device, situated between the plurality of USB cameras and a streaming application of the host unit, incorporating a circular buffer architecture temporarily parking a plurality of data packets of video streaming.

14. A method to optimize video streaming of one or more of universal serial bus (USB) cameras streaming via a BULK interface of universal serial bus (USB) to a host unit, the method comprising the steps of:
a) providing a video streaming data transfer between one or more USB cameras and said host unit at data transfer rate,
b) evaluating, by monitoring a USB bus connected to one or more USB cameras and providing updates on available USB bandwidth according to a throughput analyzer computer program, a USB version supported by the host unit and a corresponding maximum transfer rate for the BULK interface, c) assessing, by the throughput analyzer computer program, a utilization amount of the USB bus by the host unit by including all devices connected to the USB bus,
d) monitoring as usage amounts, a memory usage and a CPU usage of the host unit to correspondingly alter a transfer rate, a resolution, and or a frame rate of the one or more USB cameras,
e) providing a throughput control signal in response to one or more of said evaluating USB version, assessing utilization amount of the USB bus, and monitoring usage amounts, and
f) restricting a data transfer rate of the one or more USB cameras in response to said throughput control signal.

15. The method to optimize video streaming as claimed in claim 14, wherein the restricting the data transfer rate is different for each of the one or more USB cameras.

16. The method to optimize video streaming as claimed in claim 14, wherein the restricting the data transfer rate is by varying a complementary metal oxide semiconductor (CMOS) pixel clock of an image sensor of the one or more USB cameras.

17. The method to optimize video streaming as claimed in claim 14, wherein the restricting the data transfer rate is by varying the horizontal blanking line time of an image sensor of the one or more USB cameras.

18. The method to optimize video streaming as claimed in claim 14, wherein the restricting the data transfer rate is by selectively dropping at least one data packet of the one or more USB cameras.

19. The method to optimize video streaming as claimed in claim 14, wherein the throughput analyzer computer program tracks free buffers zones in a circular buffer architecture wherein a data overflow occurs when a free buffer zone count between a source pointer and a sink pointer is at zero of the circular buffer.

20. The method to optimize video streaming as claimed in claim 19, including providing a low threshold, a medium threshold and a high threshold, wherein the multiple threshold of the free buffer zone count are created for a corresponding low packet drop rate, a medium packet drop rate and a high packet drop rate.

21. The method to optimize video streaming as claimed in claim 19, wherein the throughput analyzer tracks a time taken for a data packet to travel from the source pointer to the sink pointer of the circular buffer.

22. The method to optimize video streaming as claimed in claim 18, further providing dropping a data packet of non-critical adjacent frames.

23. The method to optimize video streaming as claimed in claim 18, wherein the restricting the data transfer rate is by dropping a data packet of unreferenced non-critical adjacent frames.

24. The method to optimize video streaming as claimed in claim 18, wherein the restricting the data transfer rate is by dropping a data packet of non-critical adjacent frames while critical adjacent frames identified with respect to a prescribed object are retained.

25. The method to optimize video streaming as claimed in claim 24, wherein the one or more USB cameras consist of a USB camera or a USB Video Class (UVC) Device or a combination thereof, and wherein the identifying of the critical adjacent frames is by monitoring a luma based and a chroma based image statistics from a statistics block of the USB Video Class (UVC) Camera/UVC Device.

* * * * *